Sept. 14, 1965 R. W. HUTCHINS 3,206,700
FLUID MOTION SENSING TRANSDUCER
Filed July 24, 1961 3 Sheets-Sheet 1

Inventor
ROGER WILLIAM HUTCHINS by: *Cavanagh & Norman*

Sept. 14, 1965  R. W. HUTCHINS  3,206,700

FLUID MOTION SENSING TRANSDUCER

Filed July 24, 1961  3 Sheets-Sheet 2

Inventor

ROGER WILLIAM HUTCHINS by: Cavanagh & Norman

Sept. 14, 1965   R. W. HUTCHINS   3,206,700
FLUID MOTION SENSING TRANSDUCER
Filed July 24, 1961   3 Sheets-Sheet 3

Inventor
ROGER WILLIAM HUTCHINS by: *Cavanagh & Norman*

3,206,700
FLUID MOTION SENSING TRANSDUCER
Roger William Hutchins, Toronto, Ontario, Canada, assignor to Hunting Survey Corporation Limited, Toronto, Ontario, Canada, a Canadian company
Filed July 24, 1961, Ser. No. 126,824
1 Claim. (Cl. 336—30)

This invention relates to transducers and more particularly to transducers adapted to detect the motion of an electrically conductive fluid in a closed channel.

The problem of detecting and measuring the acceleration due to gravity in moving vehicles has led to various designs each involving the use of moving parts resulting in errors arising due to the effect of gravity or the inertia due to motion on these parts.

It is the main object of this invention to provide a transducer for the flow detection of an electrically conductive fluid which will have a sensitivity range suitable for the detection of flow resulting from pressure variations in a column of electrically conductive fluid having a peak value of the order of $10^{-4}$ dynes per square centimeter at a frequency of about one cycle per second.

It is a further object of this invention to provide a transducer which will provide sensitivity over the selected range of operation without the use of moving mechanical parts.

It is a further object of this invention to provide a transducer which will convert flow velocity in a column of electrically conductive fluid directly to an electrical signal thus to provide an electrical signal responsive to flow velocities adapted to be recorded or further processed by conventional signal processing and utilizing means.

These and other objects and features of this invention will become apparent when taken in conjunction with the following specification and drawings.

Figure 1:
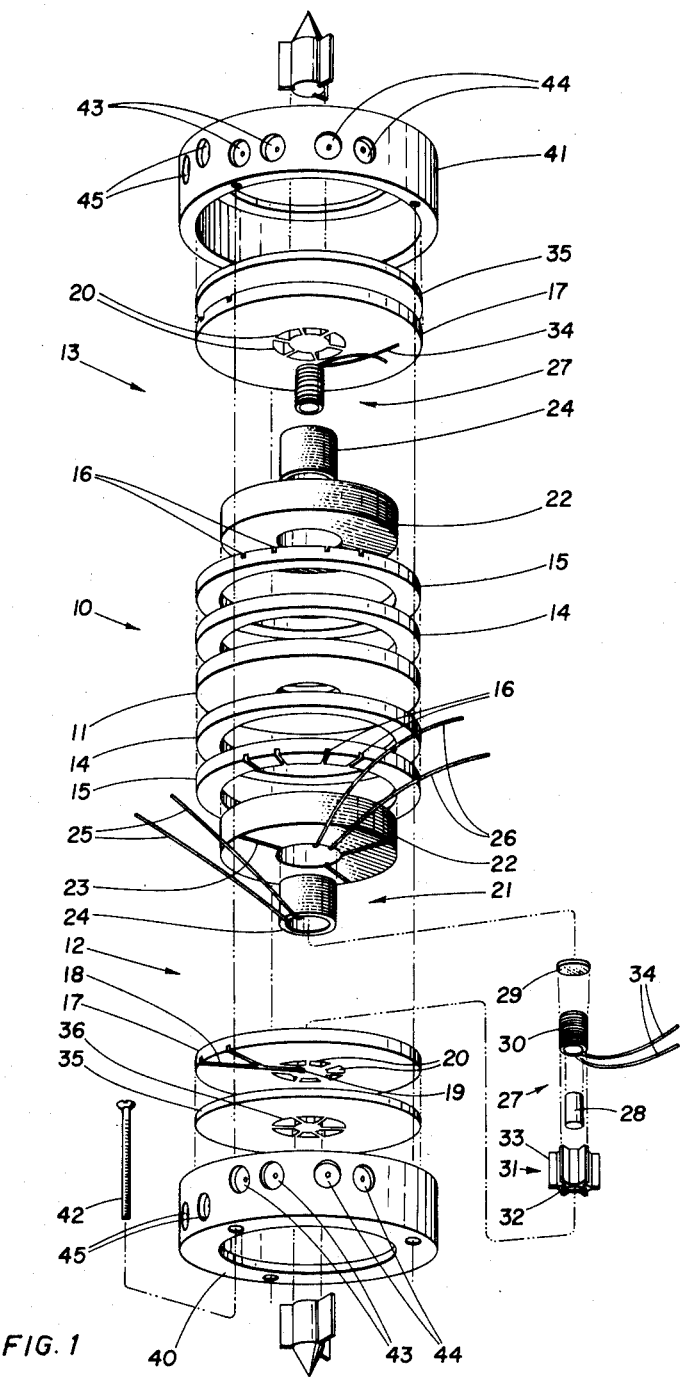
FIGURE 1 is an exploded perspective view of a transducer embodying this invention.
Figure 2:
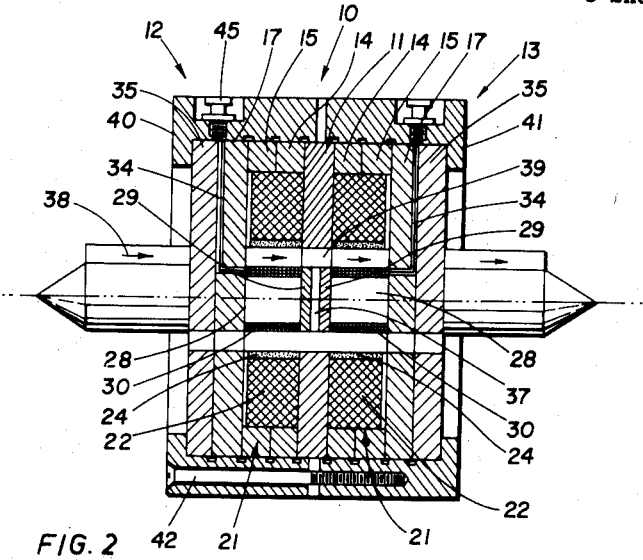
FIGURE 2 is a mid-vertical section taken along the centre line of the transducer.

Referring to FIGURE 1 and FIGURE 2, the transducer shown generally at 10 comprises a centrally located annularly shaped disc 11. The transducer has two halves, a left-hand half shown generally at 12 and a right-hand half shown generally at 13 disposed to the left and to the right of disc 11 respectively. Left-hand half 12 and right-hand half 13 are conjugate to each other and in this specification one half only will be described the other being an identical assembly but of the opposite hand.

Referring in particular to left-hand half 12 in FIGURE 1 and FIGURE 2, left-hand half 12 comprises a ring member 14 having plane opposing faces and having an outside diameter substantially equal to the outside diameter of disc 11. Ring member 14 is secured concentrically to and abutting with the left face of disc 11 by means of an adhesive such as for instance, epoxy resin.

A grooved ring member 15 having space dimensions substantially equal to ring member 14 is secured to the left face of ring member 14 by means of an adhesive. A plurality of radially disposed grooves 16 are formed in the left face of grooved ring member 15.

A grooved plate member 17 having a substantially circular configuration and having two opposing plane faces is secured concentric to and abutting with the left face of grooved ring member 15 by means of an adhesive.

Grooved plate member 17 has an outside diameter substantially equal to the outside diameter of grooved ring member 15. A radially disposed slot 18 is formed in the left face of grooved plate member 17 and extends from a point on the periphery of grooved plate member 17 to terminate in a hole 19 pierced axially through grooved plate member 17 substantially towards the centre thereof. A plurality of semi-circular channels 20 disposed concentrically are pierced axially through grooved plate member 17.

Grooved plate member 17, grooved ring members 15, ring member 14, and disc 11, are made from a ferromagnetic material such as for instance ferrite and are adapted to enclose within the cylindrically shaped closure so formed an electro-magnetic assembly shown generally at 21.

Assembly 21 comprises an exciter coil 22 having a hollow cylindrical configuration and having an outside diameter substantially equal to the inside diameters of grooved ring member 15 and ring member 14. A plurality of spacers 23 are secured to the left face of exciter coil 22 and are adapted by bearing against the inner face of grooved plate member 17 to hold the right face of exciter coil 22 securely against the left face of disc 11.

Located within the hollow core of exciter coil 22 is a compensator coil 24 having a length substantially equal to that of exciter coil 22 and having an outside diameter adapted to be a snug fit within the core of exciter coil 22. Compensator coil 24 is hollow wound and is substantially small in size as compared to exciter coil 22.

Electrical supply leads 25 from compensator coil 24 and similar leads 26 from exciter coil 22 are fed through grooves 16 in grooved ring member 15.

A core assembly shown generally at 27 comprises a solid cylindrically shaped core 28 and a core disc 29 being in axial alignment and in face-to-face relationship with each other and secured to each other by means of an adhesive. Core 28 and core disc 29 are made from a ferro-magnetic material. A pick-up coil 30 having a length substantially equal to core 28 is wound to be a snug fit over core 28 and has an outside diameter substantially equal to the outside diameter of core disc 29. An axial guide member shown generally at 31 made from a non-electrically conductive material, comprises a hollow cylindrically shaped body 32 having disposed thereabout a plurality of radial vanes 33. The internal diameter of body 32 is a snug fit over pick-up coil 30. Core assembly 27 is adapted to be placed within the core of hollow wound compensator coil 24.

The left face of assembly 27 abuts the inner face of grooved plate member 17 and is held in axial alignment with compensator coil 24 by radial vanes 33. The number of radial vanes 33 matches in number the plurality of channels 20 in grooved plate member 17, channels 20 being in axial alignment with the flow spaces between radial vanes 33.

Pick-up coil 30 extends substantially the length of compensator coil 24 and terminates at the right end thereof at the left face of annular disc 11. The right face of core 28 is coplanar with the right face of compensator coil 24, thus core disc 29 intrudes within annular disc 11 substantially towards the centre thereof.

Electrical supply leads 34 from pick-up coil 30 are fed through hole 19 and placed in slot 18.

A plate member 35 of ferro-magnetic material and having a substantially circular configuration is secured concentric to and abutting with the left face of grooved plate member 17. A plurality of semi-circular channels 36 matching in number channels 20 in grooved plate member 17 are pierced axially through plate member 35 and are in alignment therewith.

Right-hand half 13 being constructed in a similar manner to left-hand half 12 is aligned with half 12 whereby flow channels and radial vanes in half 13 are in axial alignment with the corresponding channels 20 and 26 and radial vanes 33 in half 12. Upon assembly core disc 29 is separated from the corresponding core disc in right-hand half 13 by a substantially small air gap 37.

In this manner a flow channel indicated by arrows 38 is formed through halves 12 and 13, extending from the left face of plate member 35 to the right face of the corresponding plate member in right-hand half 13. Flow channel 38 has a segmented annular cross-section in that portion located between pick-up coil 30 and compensator coil 24, being divided thus by radial vanes 33 on axial guide member 31, the same being true for that corresponding portion in right-hand half 13. A centre portion 39 of flow channel 38 having a continuous annular configuration is bounded on the outside by the inside diameter of disc 11, which is substantially equal to the outside diameter of radial vanes 33, bounded on the inside by core disc 29 and its conjugate right-hand disc, and has a thickness substantially equal to that of disc 11.

A pair of bell halves 40 and 41 form an exterior casing for the assembled halves 12 and 13 and are adapted by means of screws 42 to hold in fixed relationship all parts of halves 12 and 13. Lead wires 25, 26 and 34 are secured to binding posts 43, 44 and 45 respectively in bells 40 and 41.

Figure 4:
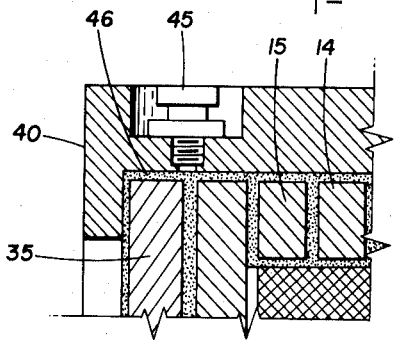
FIGURE 4 is an enlarged partial view of a portion of the transducer shown in FIGURE 2; and, FIGURE 5 is a diagrammatic representation of the elements of the transducer illustrating the electrostatic shielding.

Referring to FIGURE 4, all air space within transducer 10 is filled with a non-electrical conducting filler material 46 such as for instance epoxy resin, including air gap 37 but with the exception of flow channel 38 by means of a conventional vacuum process. During this process flow channel 38 is kept free of filler material by employing a vanishing core piece having substantially the same configuration as flow channel 38.

Figure 3:
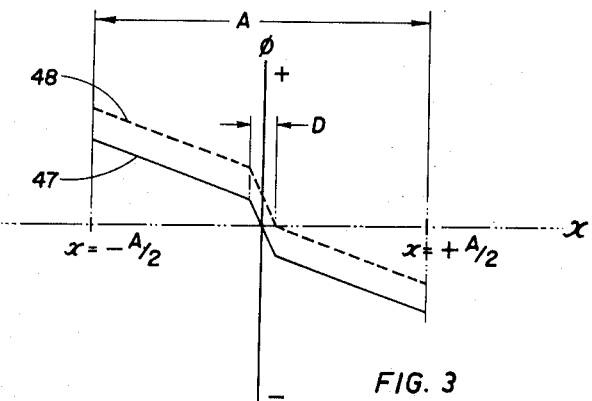
FIGURE 3 is a diagrammatic representation of the transducer showing the principle of operation.

Referring to FIGURE 3 a diagrammatic view of transducer 10 is shown and in the following description of the principle of operation the following symbols are used:

$A$ = width of disc 11
$C$ = subscript denoting compensator circuit
$D$ = width of air gap 37
$E$ = voltage
$F$ = subscript denoting output
$f$ = frequency
$I$ = current
$i = \sqrt{-1}$
$M$ = centre portion 39
$N$ = total number of turns on pick-up coils 30
$t$ = time
$V$ = average flow velocity through transducer 10:

$$\frac{\text{volume flow rate}}{\text{flow cross section}} = \frac{dx}{dt}$$

$X$ = axial position in transducer 10
$Z$ = impedance
$\phi$ = axial component of magnetic flux
$\phi_x$ = value of $\phi$ at position X
$\omega = 2\pi f$ Transducer 10 is installed in series in a column of an electrically conductive fluid in which flow velocities are to be detected. Exciter coils 22 which are connected in series opposing are connected to an alternating current supply having a frequency $f = 150$ cycles per second approximately which results in opposing magnetic fluxes in each half 12 and 13 of frequency $f$. The instantaneous axial component of magnetic flux $\phi$ occurring in cores 28, core discs 29 and air gap 37 is shown as a function 47 of position X resulting from a current flowing through exciter coils 22. Position X is the measure of the displacement from the centre of transducer 10 to the right which, by convention, is taken as positive or to the left which is taken as negative.

Centre portion 39 of flow channel 38 upon being filled with an electrically conductive fluid forms a short circuited turn of axial length "A" which is equal to the thickness of disc 11 whereas radial vanes 33 open circuit the fluid throughout the remainder of transducer 10.

Compensator coils 24 which are connected in series aiding are connected to an alternating current of frequency $f$ which upon this current supply having the correct phase-amplitude relationship in relation to the current supplied to exciter coils 22 will result in function 47 being displaced outwardly as shown by dotted line 48 in FIGURE 3. In this manner by suitably controlling the phase and amplitude of the current supply to compensator coils 24 the value $\phi$ can be made equal to zero at the position $X=0$ in which case transducer 10 will be balanced. The value of $\phi$ upwardly is taken as positive and the value of $\phi$ downwardly is taken as negative.

Upon a current flowing in exciter coils 22 a current will be induced in pick-up coil 30 and a current of equal voltage but of opposite sign as that of pick-up coil 30 will be induced in the corresponding pick-up coil in right-hand half 13. Pick-up coils 30 are connected in series aiding and upon a current flowing in exciter coils 22 and transducer 10 being in balance the output voltage across pick-up coils 30 will therefore be zero. The output voltage from pick-up coils 30 will vary from zero upon a change in the current supplied to compensator coils 24, which will cause a variation from zero in the value of $\phi_x = 0$ or upon any peripheral currents flowing in the fluid occupying centre portion 39.

Since the exciting and compensating corrents are a periodic function of time then the magnitude of $\phi$ is also periodic at the same frequency. The relative amplitude of $\phi_x$ is a function of the position X alone and is periodic at the frequency $f$.

Considering the annulus of fluid M occupying the centre portion 39, the magnetic flux crossing a plane of infinitesimal thicknens $M_x$ between $-A/2$ and $+A/2$ of the annulus M is the axial component $\phi_x$ at position X.

An electromotive force, $$E_{mx} = -\frac{dx}{dt}$$

will be induced around $M_x$.

Since $\phi$ is a function of both time, $t$ and position, X then $$\frac{d\phi_x}{dt} = \frac{\partial \phi_x}{\partial t} + \frac{\partial \phi_x}{\partial_x} \cdot \frac{dx}{dt}$$

Upon $dx/dt$ being the flow velocity of the fluid through transducer 10, put $$V_x = \frac{dx}{dt}$$

thus $$E_{mx} = -\left[\frac{\partial \phi_x}{\partial t} + \frac{\partial \phi_x}{\partial_x} \cdot V_x\right]$$

If the impedance of a small width $\Delta_x$ of $M_x$ is $Z_m$ the current which results is $$I = \frac{E_{mx}}{Z_m}$$

If the frequency of the excitation current is $f$ and $\omega = 2\pi f$ then, $$\frac{\partial \phi_x}{\partial t} = i\omega \phi_x$$

Thus the total current $I_m$ through M is given by $$I_m = \frac{1}{Z_m} \int_{-A/2}^{+A/2} \left[i\omega \phi_x + \frac{\partial \phi_x}{\partial_x} \cdot V_x\right] dx$$

where $Z_m$ is the effective impedance of M.

Now $$i\omega \int_{-A/2}^{+A/2} \phi_x dx = 0$$

providing that $\phi_x = 0$ at $X = 0$ and, $$I_m = \frac{V_x}{Z_m} \int_{-A/2}^{+A/2} \frac{\partial \phi_x}{\partial x} dx$$

Thus $I_m$ is proportional to the velocity $V_x$ and the magnitude of the flux and therefore of the exciting current.

The current $I_m$ results in a flux $\phi_m$ which couples with pick-up coils 30 which are in series aiding.

The induced voltage is given by $$E_F = -\frac{N d\phi_m}{dt}$$

where N is the total number of turns on pick-up coils 30.

The voltage $E_F$ constitutes the output of transducer 10 which is fed to a suitable detection system.

The current input into compensator coils 24 is continuously adjusted by a servo loop forming part of the detection system to null the output $E_F$. Therefore, the magnitude of the compensating current is a measure of the flow velocity $V_x$.

The pressure difference between the inlet and outlet of transducer 10 during fluid flow is the sum of the hydrodynamic pressure drop due to flow plus the magnetic drag resulting from the interaction of $I_m$ with $\phi$. In the case of no fluid flow $$\left(\frac{dx}{dt} = 0\right)$$

and a current $I_C$ is passed through compensator coils 24 which results in an output voltage $E_F$ then in the expression, $$I_m = \frac{1}{Z_m}\left[i\omega \int_{-A/2}^{+A/2} \phi_x + V_x \int_{-A/2}^{+A/2} \frac{\partial \phi_x}{\partial x} \cdot dx\right]$$

the first integral is no longer zero and a current $I_m$ will flow. This will result in a pressure difference tending to pump fluid through transducer 10. If $V_x$ is maintained equal to zero then the current $I_C$ will be a measure of the pressure difference across transducer 10.

Figure 5:
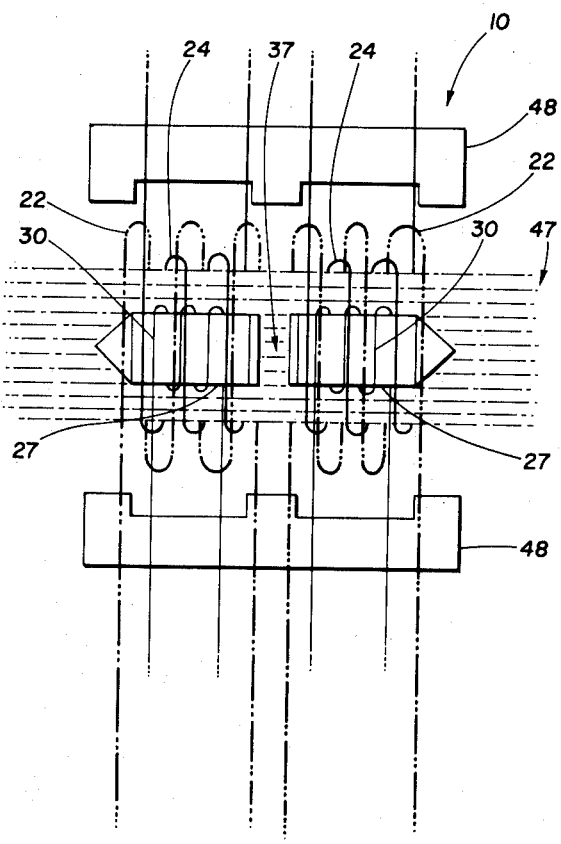

Referring to FIGURE 5, the transducer elements are shown which comprise: cores 27 separated by air gap 37, electrically conductive fluid 47, pick-up coils 30, exciter coils 22, and compensator coils 24 surrounded by magnetic shielding 48. From the diagram it will be seen that pick-up coils 30 are shielded from stray electro-static effects by the fluid within which they are immersed. Since the fluid is a good conductor any plane normal to the axis presents an equipotential surface, whereby all lines of force are in an axial direction. Thus any signal detected in pick-up coils 30 must originate from exciter coils 22 modified by compensator coils 24. In addition, exciter coils 22 and compensator coils 24 are shielded from external stray fields by shielding 48. Air gap 37 serves to stabilize transducer 10 against the effects of environment and external noise, as well as providing geometric symmetry for coupling of pick-up coils 30.

From the foregoing it will be seen that the invention comprises a pair of opposing coil assemblies each consisting of three concentrically located coils enclosed within a mass of ferro-magnetic material providing a confined flow path for magnetic flux created by current flowing in the coils. An annular fluid flow channel continuous in a centre portion and segmented elsewhere within the transducer is provided intermediate of the two innermost coils and the two mid coils. The two innermost coils are connected in series aiding, the two mid coils are connected in series aiding, and the two outermost coils are connected in series opposing whereby a current fed into the two outermost coils, the effect of which is controlled by a second current fed into the two mid coils will tend to induce a current into the two innermost coils. Upon an electrically conductive fluid occupying the flow channel the current required in the two mid coils to produce a zero output voltage in the two innermost coils will be a measure of the flow velocity in the case of fluid flow through the flow channel. If the output voltage of the innermost coils is not zero and there is no flow, then the current to the two mid coils is a measure of the pressure difference across the transducer as is also the non zero output voltage from the two innermost coils.

What I claim is:

A transducer for the detection of motion in an electrically conductive fluid and comprising: a pair of coil assemblies; means including a core supporting said coil assemblies in spaced-apart relation and axial alignment and defining a fluid flow channel through the axis of said coil assemblies; an exciting coil in each assembly; means electrically connecting the exciting coils of said assemblies electrically in series and magnetically opposing; a compensating coil in each of said assemblies concentrically located therein with respect to the exciting coil thereof and including means connecting the compensating coils of each of said assemblies electrically in series and magnetically aiding; and a pick-up coil in each of said assemblies concentric with the exciting coil and compensating coil thereof including means electrically connecting the pick-up coils of said assemblies electrically in series and magnetically aiding.

References Cited by the Examiner

UNITED STATES PATENTS

| | | | |
|---|---|---|---|
| 2,494,579 | 1/50 | Pimlott et al. | |
| 2,568,587 | 9/51 | Macgeorge. | |
| 2,583,724 | 1/52 | Broding | 336—30 X |
| 3,017,589 | 1/62 | Chass | 336—30 X |

JOHN F. BURNS, *Primary Examiner*.